Patented May 12, 1942

2,282,804

UNITED STATES PATENT OFFICE 2,282,804

HEAT TREATED STABILIZED FLAKED CEREAL GERM PREPARATION

Sidney Musher, New York, N. Y., assignor to Musher Foundation Incorporated, New York, N. Y., a corporation of New York No Drawing. Application April 22, 1940, Serial No. 330,986

4 Claims. (Cl. 99—153)

The present invention relates to the preparation of stabilized, heat treated wheat germ flakes which may be kept for relatively long periods without protein and fat decomposition which would render them substantially unsaleable.

It has not been found possible to manufacture flaked wheat germs so as to have satisfactory keeping quality in order to enable the merchandising of such a product through ordinary channels of distribution.

It is the purpose of the present application therefore to provide means for producing a substantially stabilized flaked wheat germ preparation which will keep for long periods of time without deterioration.

Still further objects will appear from the more detailed description set forth below; it being understood, however, that this more detailed description is given by way of illustration and explained only, and not by way of limitation, since various changes therein may be made by those skilled in the art without departing from the scope and spirit of the present invention.

In accordance with the present invention, the wheat germ is heated with milk-solids-not-fat, particularly whey, in aqueous dispersion, preferably until at least partially dehydrated and then further heat reacted and dried at between 400° F. and 600° F.

The whey that is particularly utilized in accordance with the present invention is obtained from the manufacture of cheese and is the material drawn off after the milk has been curdled with rennet, for example, and after the curd has formed the proper degree of hardness, followed by removal of a substantial amount of the lactose. Of particular importance for use is the whey that is obtained from the manufacture of cottage cheese, whereby coagulation is effected by natural souring and the liquid has been heated nearly to boiling. The whey is then further treated in order to remove a substantial portion of the lactose, the lactose being allowed to crystallize out.

The un-desugared whey is substantially free of casein and of fat and will contain about 70% to 75% of lactose and 10% to 15% protein, the protein being substantially free of casein and being present in the form of milk albumin.

Where a portion of the lactose is desirably crystallized out, the whey will contain about 35% to 45% protein in the form of albumin and about 40% to 55% of lactose with approximately 13% to 17% total ash, based upon the solids weight of the whey.

Apparently in the production of the whey, antioxygenic action is materially enhanced when the lactose content is reduced by from 25% to 40%.

Moreover, it has been found of particular desirability to subject the whey to a temperature of at least about 220° F. and preferably to 235° F. to 245° F. for about 15 to 30 minutes or more at some stage in its processing whereby the whey is caramelized. The caramelization process further enhances the protective effect of the whey and unless the whey has been subjected to this caramelization step, the most desirable results of the present invention are not secured.

In addition to utilizing aqueous dispersions of whey, aqueous dispersions of other milk solids may also be employed including particularly concentrated buttermilk where at least a portion of the lactose has been converted to lactic acid. There may also be utilized evaporated buttermilk containing about 25% to 30% total solids, condensed or semi solid buttermilk containing about 35% to 45% total solids, dried buttermilk rendered aqueous by dilution, skim milk in concentrated form, whole milk and whey residue.

Although the heat reacted dried wheat germ flakes may contain as little as 1% of milk solids against the total weight of wheat germ present in the flakes, it is desirable for there to be present not less than about 2% of the milk solids in order to produce the desired antioxygenic effect. The stabilized wheat germ flakes may contain as much as from about 30% to 40% of the milk solids against the total weight of the wheat germ solids.

It is not particularly desirable for the wheat germ in the aqueous dispersion of milk solids to undergo any fermentation and the heating is intended to produce the antioxygenic effect of the milk solids on the wheat germ and which antioxygenic effect is further enhanced by the subsequent final drying and flaking at 400° F. to 600° F.

It is particularly desirable for the combination of wheat germ and aqueous milk solids dispersion to be heated at a pH of between about 4 and 6.8 and desirably at a pH of about 5.5 to 6. This pH adjustment is desirably made before the wheat germ is subjected to the first heating operation and it is also desirable for this pH to be retained at the time that the final product is flaked at 400° F. to 600° F. The pH adjustment is beneficial in producing the desirable stabilizing results of the present invention.

The pH adjustment may be made by the addition of citric, lactic, tartaric, malic, hydrochloric, phosphoric or acetic acids.

Where desired, the wheat germ may be finely ground before combining with the aqueous milk solids or the combination may be passed through a colloid mill in order to reduce the particle size of the wheat germ so that each individual particle of the wheat germ is contacted by and dispersed in the aqueous milk solids.

In addition to using ordinary liquid unconcentrated whey or skim milk, powdered or dehydrated milk solids may also be employed. For example, the wheat germ may be combined with water and to the aqueous mass there may be added dehydrated milk-solids-not-fat but, in any event, the milk-solids-not-fat must be placed into aqueous condition and combined with the wheat germ in aqueous condition.

During the first heating and partial dehydration period, a temperature in excess of 170° F. to 180° F. and preferably over 200° F. is maintained. Following this first heat treatment with the aqueous dispersion of milk solids, the mass may be shredded or prepared in flaked form and then completely dehydrated, caramelized, and heat reacted at 400° F. to 600° F. so that the finished toasted product is available in flake, shred or other form desirable for use as a toasted cereal.

Where the product is in flaked or shredded form with a large surface area exposed, it is found that the oil has a tendency to seep out to form a thin continuous or discontinuous film upon the surface of the flakes. At the elevated temperature of 400° F. to 600° F., a chemical reaction appears to take place between the milk-solids-not-fat or the whey and such oily film. Particularly when the milk-solids-not-fat or whey are in caramelized condition, the oily cells are protected against oxidative deterioration and development of rancidity by the reaction product or heat combination between the caramelized milk-solids-not-fat or whey and the oil which has exuded through the surface and has formed a continuous or discontinuous film on the surface of the flakes.

It is preferable to reduce the moisture content of the aqueous wheat germ milk solids combination to less than about 30% to 40% before subjecting to the final 400° F. heat treatment and as a result of this final heating, the moisture content is further reduced to less than 15%.

The wheat germ may be heated with a very small amount of water containing milk solids so that as little as about 40 pounds of water containing about 10% milk solids or 50 to 60 pounds of partially condensed skim milk containing 20% total solids may be combined with 100 pounds of wheat germ, the product desirably acidified to a pH of about 5.5 to 6 and then heated at over about 200° F. to reduce the moisture content to less than about 30%.

The wheat germ may also first be heated in plain water and then after a partial drying, there may be added a small amount of milk solids, preferably whey, to the heated wheat germ in aqueous dispersion followed by additional heating. This product may then be run out in ribbons for flaking and subjected to a temperature of between 400° F. and 600° F., the final dried flaked product being substantially stabilized against oxidative deterioration.

Apparently some reaction occurs at the elevated temperature whereby the wheat germ in contact with the aqueous milk solids, particularly whey, acquires enhanced stabilization and this elevated temperature treatment is very important in order to obtain the fully desirable stabilizing results of the present invention.

Where desired, the wheat germ may be subjected to an expression in order to remove the wheat germ oil originally contained therein and the wheat germ press cake or solvent extracted residue may be employed in lieu of the full oil-containing wheat germ.

Together with or in lieu of the wheat germ, it is also possible to utilize other high fat containing cereal germs including corn germ, oat germ and rice germ for the preparation of novel, flaked, stabilized germs.

The brans and polishings such as rice polish or rice bran may also be utilized in accordance with the present invention for the preparation of similar high heat reacted flaked products.

There may be included in the wheat germ milk solids combination, particularly at the time that it is being subjected to the elevated temperature treatment, a relatively small amount of a sugar.

In addition to using the cereal germs and cereal polishings, there may also be employed other high fat containing polishings such as cacao polish and the polishings which are present on peanuts in the form of peanut redskins which are normally subject to very rapid rancidity and oxidation.

There may also be employed in accordance with the present invention the germinated or sprouted cereal germs and particularly those germs which have been removed from the sprouted or germinated cereal materials.

The germs, and particularly wheat germ, may desirably be subjected to a "puffing operation" before preparation with the milk solids and particularly with whey.

For example, wheat germ or other cereal germ may be prepared by being placed into a "puffing gun" which is heated to about 250° F. to 600° F. and into which steam is introduced so that the internal pressure reaches 50 to 350 pounds or more per square inch. After a period of about 5 seconds to several minutes, the pressure may be released and the germ discharged.

It is furthermore highly desirable for the puffing or exploding to be conducted at a reduced pH of between about 4 and 6.8 and preferably at about 5.5 to 6.

For example, carbon dioxide may be introduced along with the steam in order to produce the lowered pH or the germ may be sprayed or otherwise treated with a very mild acid before placing in the exploding guns.

The pH adjustment to under 6.8 and preferably to about 5.5 to 6 before puffing or exploding has been found desirable in the preparation of novel stabilized and stabilizing cereals and other materials.

The wheat germ or other cereal germ in substantially puffed condition may thereupon be subjected to treatment with whey or other milk solids in accordance with the present invention.

Together with or in lieu of the milk solids, and particularly whey, there may be employed the alcohol soluble extracts of these milk solids. For example, an extract of concentrated and preferably dried whey or other milk solids may be made by the use of methyl alcohol, ethyl alcohol, butyl alcohol or propyl alcohol in order to produce an alcohol soluble extract and which extract, after removal of the solvent therefrom, may readily be employed together with or in lieu of the whey or other milk solids in accordance with the present invention.

The present application is a continuation in part of applications, Serial No. 301,758 filed October 28, 1939, now Patent No. 2,198,205, Serial No. 239,319 filed November 7, 1938, now Patent No. 2,198,215, and Serial No. 317,175 filed February 3, 1940, now Patent No. 2,198,218.

Having described my invention, what I claim is:

1. A process of making a stabilized flaked cereal germ preparation which comprises heating the cereal germ with a relatively small proportion of caramelized milk-solids-not-fat, and then subjecting to a further heat treatment of between about 400° F. and 600° F. whereby a substantially stabilized cereal germ preparation is obtained.

2. A process of making a stabilized flaked wheat germ preparation which comprises heating the wheat germ with a relatively small proportion of caramelized milk-solids-not-fat, and then subjecting to a further heat treatment of between about 400° F. and 600° F. whereby a substantially stabilized wheat germ preparation is obtained.

3. A process of making a stabilized flaked cereal germ preparation which comprises heating the cereal germ with a relatively small proportion of caramelized milk-solids-not-fat at a pH of between 4 and 6.8, and then subjecting to a further heat treatment of between about 400° F. and 600° F. whereby a substantially cereal germ preparation is obtained.

4. A process of making a stabilized flaked cereal germ preparation which comprises heating the cereal germ with a relatively small proportion of caramelized whey, and then subjecting to a further heat treatment of between about 400° F. and 600° F. whereby a substantially stabilized cereal germ preparation is obtained.

SIDNEY MUSHER.